(12) United States Patent
Ikuno (10) Patent No.: US 8,482,784 B2
(45) Date of Patent: Jul. 9, 2013

(54) RETRIEVING SUBSTITUTE IMAGE DATA FROM A FILE WHEN IMAGE DATA FROM THE FILE CANNOT BE PROCESSED

(75) Inventor: Takao Ikuno, Yokohama (JP)

(73) Assignee: Canon Kabushiki Kaisha (JP)

( * ) Notice: Subject to any disclaimer, the term of this patent is extended or adjusted under 35 U.S.C. 154(b) by 1013 days.

(21) Appl. No.: 12/512,650

(22) Filed: Jul. 30, 2009

(65) Prior Publication Data

US 2010/0027042 A1 Feb. 4, 2010

(30) Foreign Application Priority Data

Jul. 31, 2008 (JP) .................................. 2008-198561

(51) Int. Cl.
*G06K 15/00* (2006.01)
(52) U.S. Cl.
USPC ........................................ 358/1.16; 358/1.15
(58) Field of Classification Search
USPC ............................................... 358/1.15–1.18
See application file for complete search history.

(56) References Cited

U.S. PATENT DOCUMENTS

| 6,813,394 | B1 * | 11/2004 | Matsumoto et al. | ......... 382/305 |
| 6,912,531 | B1 | 6/2005 | Matsumoto et al. | |
| 2008/0231892 | A1 * | 9/2008 | Sugahara et al. | ........... 358/1.15 |

FOREIGN PATENT DOCUMENTS

| JP | 2001-43239 A | 2/2001 |
| JP | 2003-141047 A | 5/2003 |
| JP | 2004-242066 A | 8/2004 |
| JP | 2006-139632 A | 6/2006 |

OTHER PUBLICATIONS

Japanese Office Action for corresponding JP 2008-198561, mail date Sep. 11, 2012.

* cited by examiner

*Primary Examiner* — Eric A Rust
(74) *Attorney, Agent, or Firm* — Rossi, Kimms & McDowell LLP

(57) ABSTRACT

An image processing apparatus which, when part of image data cannot be processed, is capable of extracting and processing substitute data having a predetermined relation with the image data that cannot be processed. The image processing apparatus processes an image data file including a plurality of image data portions. A data processing section of the apparatus sequentially processes the image data portions. When the image data portions include an image data portion that cannot be processed, another image data portion having attribute information associated with the image data portion that cannot be processed is extracted from the image data file. A CPU of the apparatus causes the data processing section to process the extracted image data portion as substitute image data.

11 Claims, 12 Drawing Sheets

RETRIEVING SUBSTITUTE IMAGE DATA FROM A FILE WHEN IMAGE DATA FROM THE FILE CANNOT BE PROCESSED

BACKGROUND OF THE INVENTION

1. Field of the Invention

The present invention relates to an image processing apparatus, an image processing method, and a storage medium, and more particularly to an image processing apparatus configured to receive digital image data from an external apparatus and perform various types of processing on the received digital image data.

2. Description of the Related Art

Recently, personal computers and image processing apparatuses each provided with a large-capacity memory have been in wide spread use. This technological advance makes it possible to use large image data files, and image data files per se have come to be larger in volume, higher in resolution, and higher-value-added.

Figure 1:
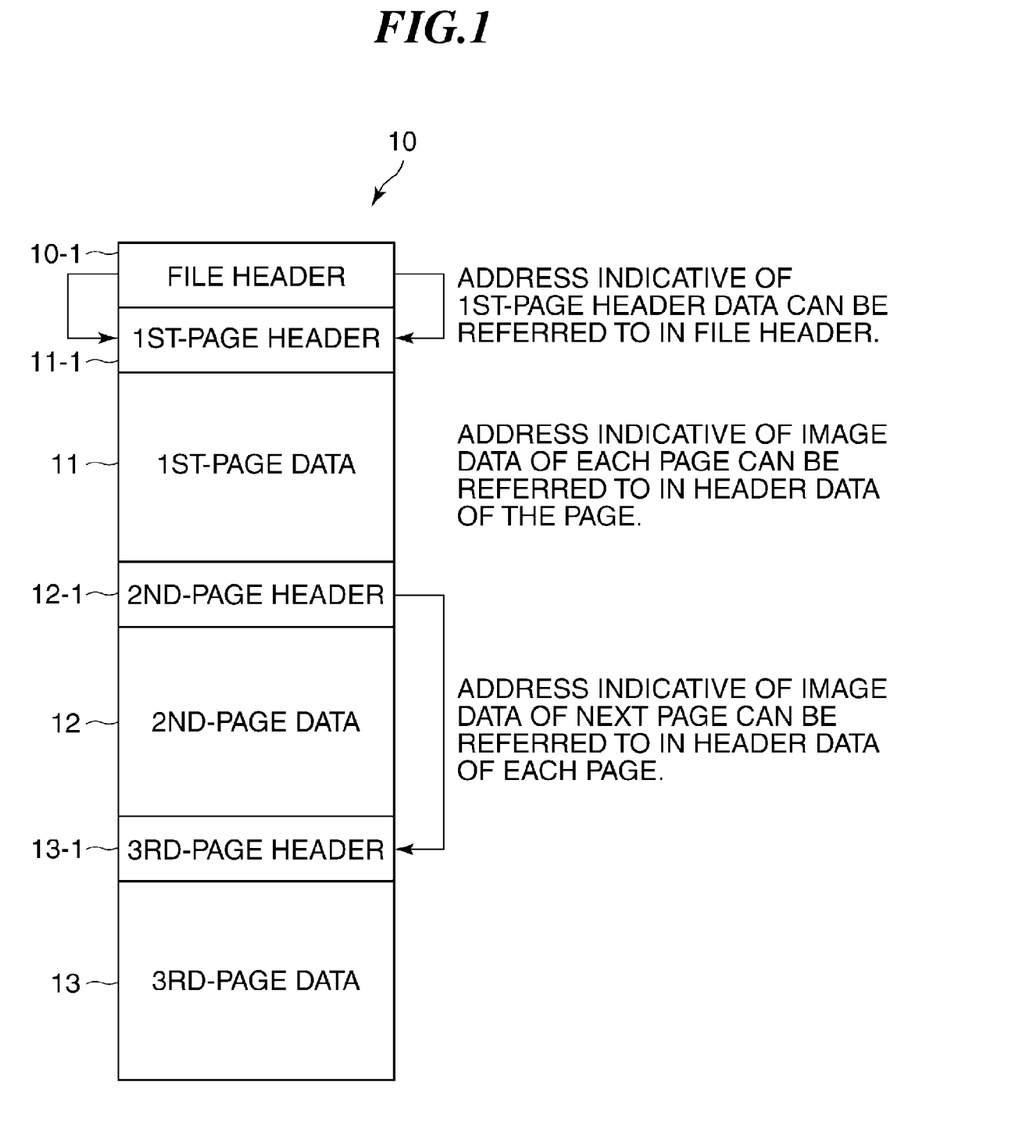
FIG. 1 is a diagram of an example of a structure of a multi-page file.

In such an environment, more and more cases occur where a large file having multiple pages including numerous image pages is used. As a multi-page image file format, there may be mentioned the TIFF file format. FIG. 1 is a diagram of an example of a multi-page file.

Referring to FIG. 1, the multi-page file 10 has a file header 10-1 in the leading part thereof, and page headers 11-1, 12-1, and 13-1 in the leading parts of respective page data portions 11, 12, and 13. The thus structured multi-page file 10 is configured to make it possible to access the page data portions 11, 12, and 13 by sequentially referring to the page headers 11-1, 12-1, and 13-1.

There has been proposed a technique of adding attribute information as an added value to each of the page data portions of a large image data file structured as above, to thereby improve the user friendliness of the page data by the attribute information (see Japanese Patent Laid-Open Publication No. 2001-43239). More specifically, Japanese Patent Laid-Open Publication No. 2001-43239 discloses a technique of achieving high-speed access to necessary image data by adding feature information to each piece of page data (hereinafter also referred to as "image data") within a data file.

However, in the case of processing a multi-page file, such as a TIFF file, using a conventional image processing apparatus, all image data portions are sequentially searched for from a leading one, thereby processing all the image data portions. This excessively increases the amount of processing, and hence the apparatus is sometimes forced to perform useless processing. Further, when processing is impossible due to destruction of part of data in a multi-page file, an excessively large image size or the lie, processing of the multi-page file is stopped at the time, so that the processing is terminated in error. Thus, it is by no means a rare case that the user has to terminate processing without achieving a desired object.

This also applies to processing of a multi-page file having attribution information added to each page so as to achieve quick processing, and therefore it is desired to develop a technique which makes it possible to eliminate a waste or an inconvenience caused by canceling processing of all the pages due to processing failure occurring on one of pages of the file.

SUMMARY OF THE INVENTION

The present invention provides an image processing apparatus and method, which, when part of image data cannot be processed, are capable of extracting and processing substitute data having a predetermined relation with the image data that cannot be processed, and a storage medium storing a program for implementing the image processing method.

In a first aspect of the present invention, there is provided an image processing apparatus for processing an image data file including a plurality of image data portions, comprising a data processing unit configured to process the image data portions, an extracting unit configured to be operable when the image data portions include an image data portion that cannot be processed, to extract another image data portion having attribute information associated with the image data portion that cannot be processed, from the image data file, and a control unit configured to cause the data processing unit to process the other image data portion extracted by the extracting unit, as substitute image data for the image data portion that cannot be processed.

In a second aspect of the present invention, there is provided a method of processing an image data file including a plurality of image data portions, comprising processing the image data portions, extracting, when the image data portions include an image data portion that cannot be processed, another image data portion having attribute information associated with the image data portion that cannot be processed, from the image data file, and processing the extracted other image data portion, as substitute image data for the image data portion that cannot be processed.

In a third aspect of the present invention, there is provided a computer-readable storage medium storing a program for causing a computer to execute a method of processing an image data file including a plurality of image data portions, wherein the method comprises processing the image data portions, extracting, when the image data portions include an image data portion that cannot be processed, another image data portion having attribute information associated with the image data portion that cannot be processed, from the image data file, and processing the extracted other image data portion, as substitute image data for the image data portion that cannot be processed.

According to the present invention, in the case of processing an image data file including a plurality of image data portions, even when image data portions to be processed include an image data portion that cannot be processed, another image data portion having attribute information associated with the image data portion that cannot be process is processed as substitute image data. By doing this, it is possible to reduce the frequency of interruption of operation in processing of the image data file including the plurality of image data portions, to thereby achieve effective processing.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing an embodiment thereof.

Figure 2:
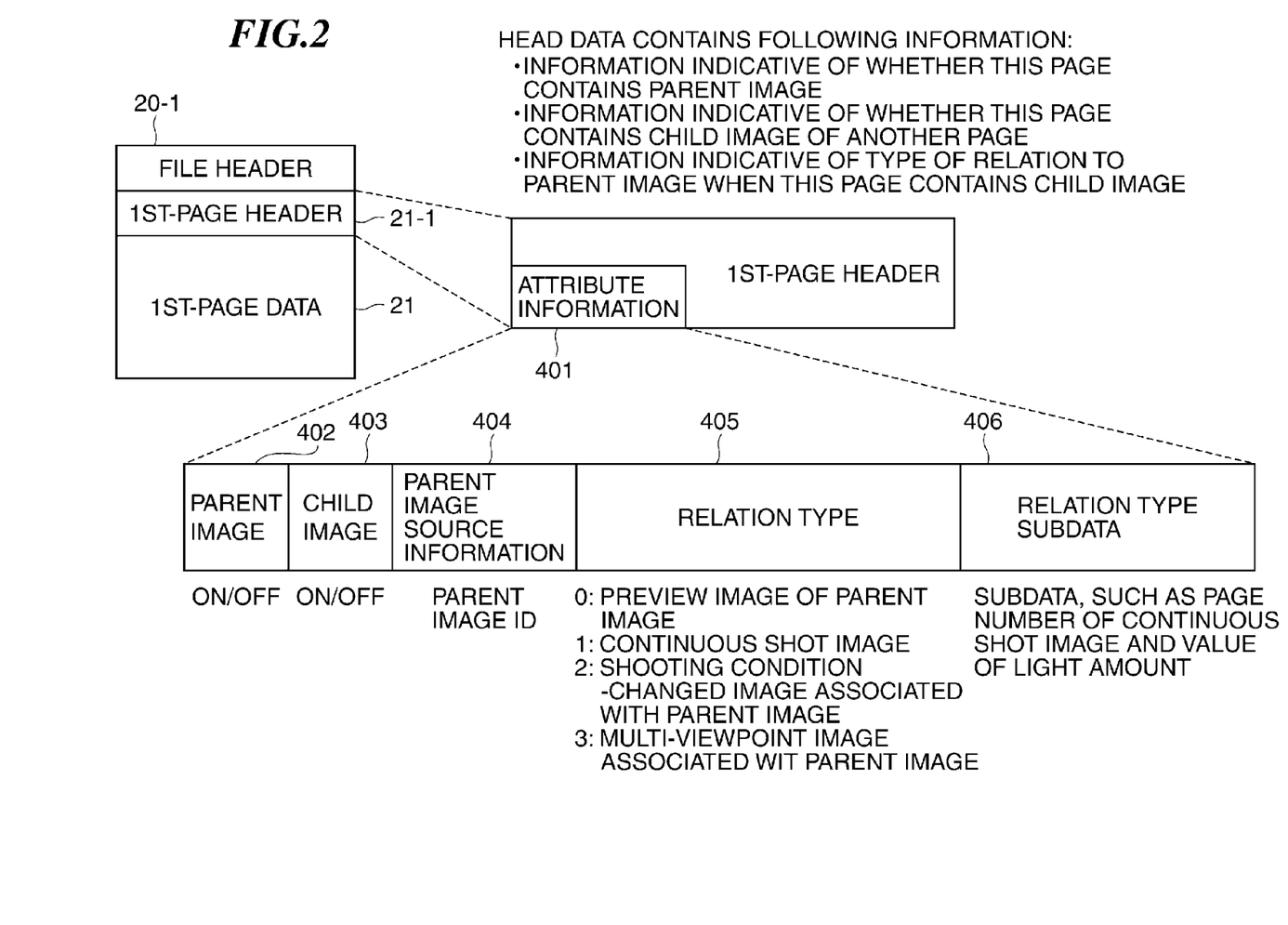
FIG. 2 is a diagram useful in explaining a part of an image data file used in an embodiment of the present invention, the image data file including a plurality of image data portions.

FIG. 2 is a diagram useful in explaining a part of an image data file (hereinafter referred to as "the multi-page file") used in the embodiment of the present invention, the image data file including a plurality of image data portions. The multi-page file 20 is an example of an extended data file which has attribute information stored as feature information in a page header 21-1 formed in the leading end of page data 21. The attribute information may include information (parent image information or child image information) indicative of whether the page data 21 contains a parent image or a child image. Further, when the page contains a parent image, the attribute information may include child image information indicative of child images associated therewith. When the page contains a child image, the attribute information may include parent image information indicative of a parent image associated therewith, information indicating a type of relation with the parent image, and relation type subdata information. The relation type information which is indicative of a type of relation between a parent image and a child image may include information (preview information) indicating that the child image is a preview image of the parent image or information (continuous shooting information) indicating that the child image is a continuous shot image associated with the parent image. Furthermore, the relation type information may also include information (shooting condition change information) indicating that the child image is a shooting condition-changed image which is shot by changing shooting conditions of the parent image, and information (multi-viewpoint information) that the child image is a multi-viewpoint image associated with the parent image, which is shot from one of a plurality of viewpoints. The relation type subdata may include subdata indicative of the page number of a continuous shot image, the value of a light amount, and so forth.

FIGS. 3A to 3D are diagrams useful in explaining examples of a multi-page file having attribute information added thereto.

Figure 3A:
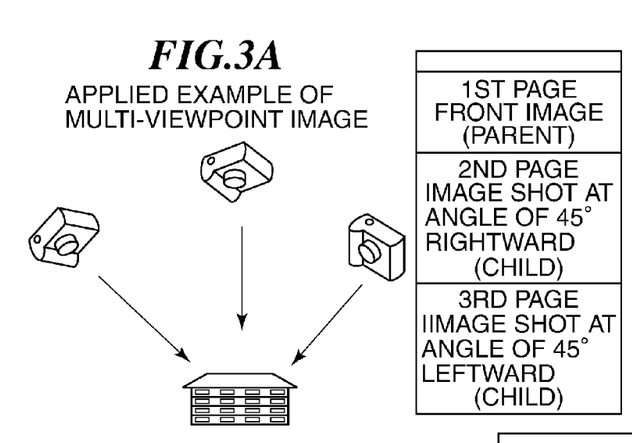
FIGS. 3A to 3D are diagrams useful in explaining examples of a multi-page file having attribute information added thereto.

FIG. 3A shows a case in which a plurality of images shot at multiple viewpoints are stored as a single multi-page file such that each of the images can be selectively viewed for browsing. For example, a parent image flag is set in association with an image (first-page image) shot from a front, and child image flags are set in association with respective images (second-page and third-page images) each shot by changing a shooting angle. Stored as attribute information associated with the child images is information indicating that the child images were shot by changing an image-taking position, and stored as subdata is information indicating that one of the child images were shot e.g. at a angle of 45° shifted leftward with respect to the parent image, and the other e.g. at a angle of 45° shifted rightward with respect to the parent image. In this case, the image shot from the front and the images shot from the changed image-taking positions can be stored as a multi-page file having three pages, and the multi-page file has extensibility that allows selective view of the images for browsing.

Figure 3B:
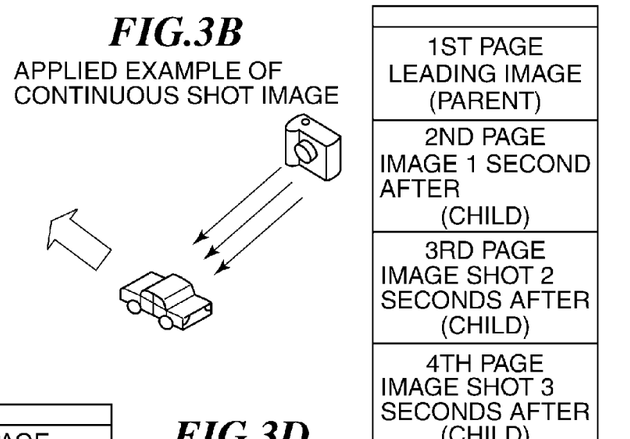

FIG. 3B shows a case in which an image sequence obtained by continuous shooting is stored as a single multi-page file. The parent image flag is set in association with a leading image (first-page image) of the image sequence, and the child image flags are set in association with respective other images (second-page to fourth-page images) of the same. Stored as attribute information associated with the child images is information indicating that the child images were obtained by continuous shooting, and stored as subdata is information indicative of continuous shooting numbers. In this case, the leading one of the continuous shot images and the other continuous shot images can be stored as a multi-page file, and the multi-page file has extensibility that allows selective view of the images for browsing.

Figure 3C:
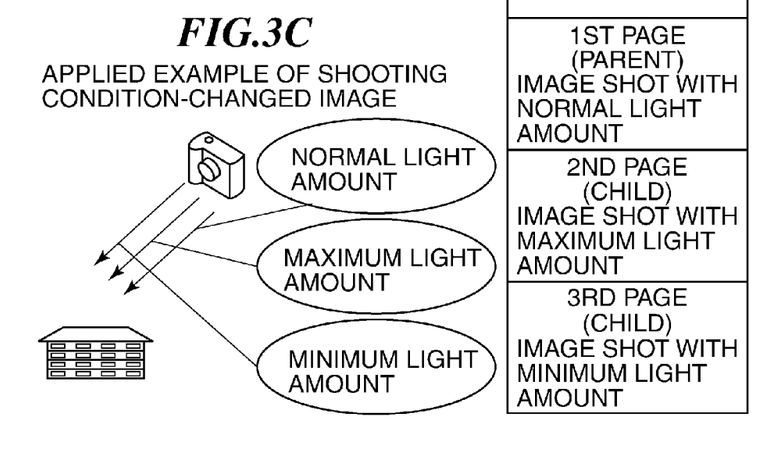

FIG. 3C shows a case in which a plurality of images shot with a shooting condition changed are stored as a single multi-page file. For this multi-page file, the parent image flag is set in association with an image (first-page image) shot under a normal shooting condition, and the child image flags are set in association with respective other images (second-page and third-page images) each shot by changing a shooting condition, such as the light amount. Stored as attribute information associated with the child images is information indicating that the child images were shot with a changed shooting condition, and stored as subdata is information indicative of the changed shooting condition. In this case, the image shot under the normal shooting condition and the images shot with a changed shooting condition can be stored as a multi-page file, and the multi-page file has extensibility that allows selective view of the images for browsing.

Figure 3D:
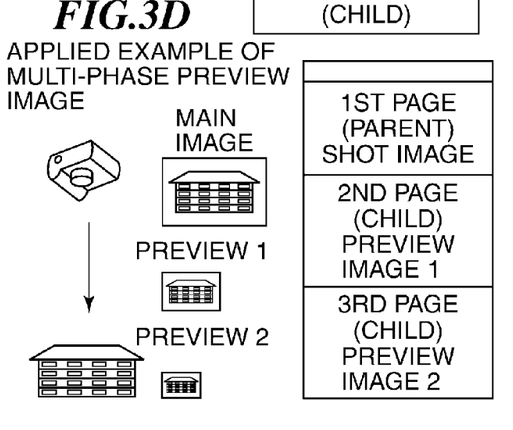

FIG. 3D shows a case in which a multi-page file is formatted such that a plurality of pages (second and third pages) other than a leading page (first page) are respective preview images having respective different numbers of pixels changed from that of the first page image. The parent image flag is set in association with a main image (first-page image), and the child image flags are set in association with the other respective image pages (second-page and third-page images) each having an image size thereof changed from that of the parent image. Each of the latter pages stores information indicative of a preview image as child image attribute information. Thus, the multi-page file has extensibility that enables an apparatus analyzing this file to select preview image data suitable for the apparatus and use this for a preview.

Figure 4:
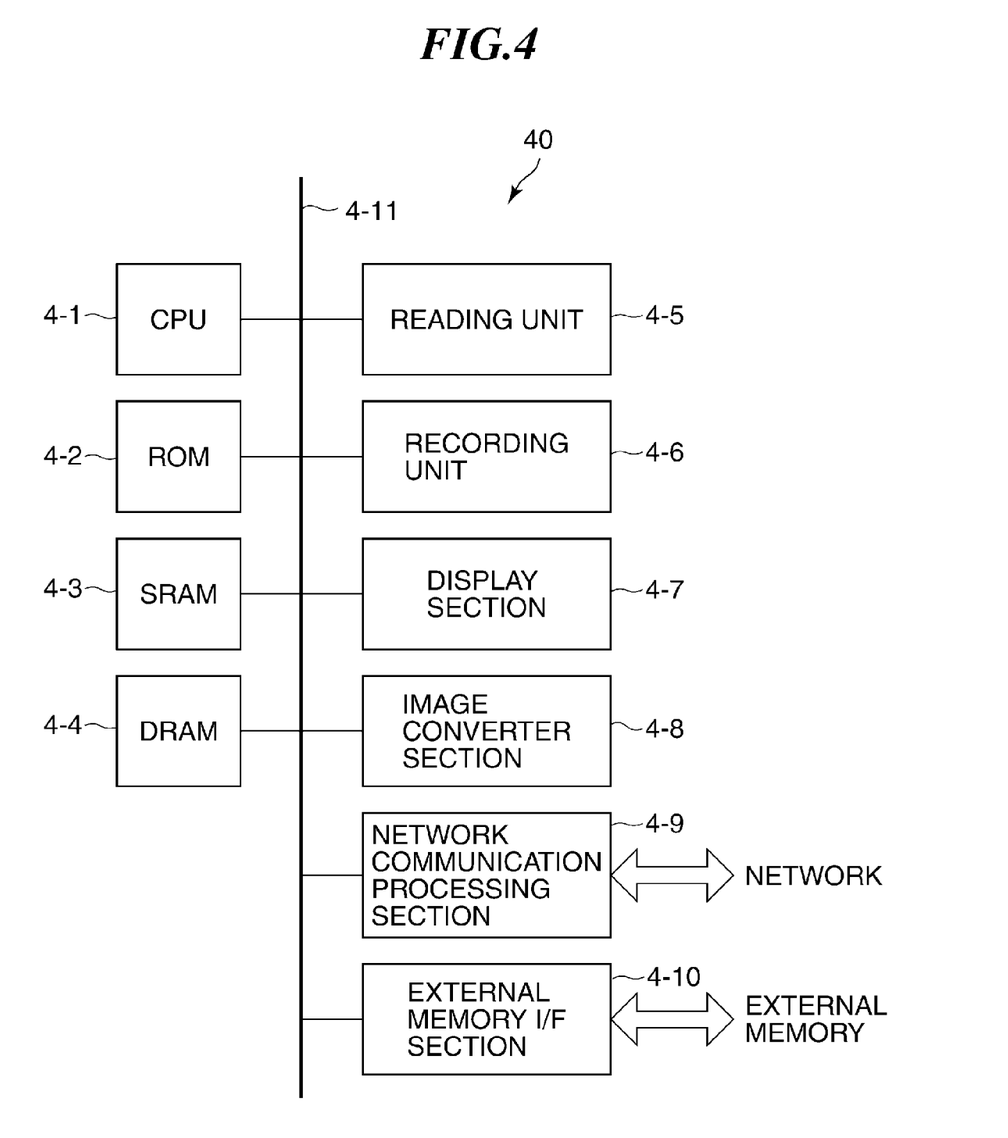
FIG. 4 is a schematic diagram showing the hardware configuration of a multifunction peripheral as an image processing apparatus according to the embodiment.

FIG. 4 is a schematic diagram showing the hardware configuration of a multifunction peripheral (hereinafter referred to as "the MFP") as an image processing apparatus according to the present embodiment. The MFP 40 is basically comprised of a CPU 4-1, a ROM 4-2, a SRAM 4-3, a DRAM 4-4, a reading unit 4-5, a recording unit 4-6, a display section 4-7, an image converter section 4-8, a network communication processing section 4-9, and an external memory interface section 4-10. The blocks shown in FIG. 4 are interconnected via a system bus 4-11.

The CPU 4-1 is a system controller that controls the overall operation of the apparatus. The ROM 4-2 stores control programs for controlling the CPU 4-1. The SRAM 4-3 stores settings and apparatus management data set and stored by an operator, and various work buffers. The DRAM 4-4 stores program control variables and the like. The reading unit 4-5 is a device that reads image data and converts the image data into binary data. Original reading (reading of originals) for transmission is performed by the reading unit 4-5. The recording unit 4-6 is a device that outputs image data onto recording sheets. The display section 4-7 provides user interface to display information on the operation and status of the apparatus. The image converter section (CODEC) 4-8 encodes and decodes image data to be handled by the external memory interface section 4-10. The network communication processing section 4-9 provides interface with a network line. The external memory interface section 4-10 is a communication control unit for controlling access to an external memory.

When the MFP 40 receives image data via the network communication processing section 4-9 or the external memory interface section 4-10, the image data is temporarily stored in the SRAM 4-3 or the DRAM 4-4. The stored image data is subjected to conversion by the image converter section 4-8 as required. Image data read by the reading unit 4-5 can also be converted by the image converter section 4-8. The processed image data is stored in the SRAM 4-3 or the DRAM 4-4. The MFP 40 executes print processing by printing out the image data stored in the SRAM 4-3 or the DRAM 4-4 on a recording sheet by the recording unit 4-6. Further, when the display section 4-7 previews the stored image data, the stored image is subjected to preview processing as image processing. Also when the network communication processing section 4-9 or the external memory interface section 4-10 delivers the stored image data to the network or an external memory, the stored image is subjected to transfer processing as image processing.

Now, a case where the MFP 40 receives a multi-page file from an external memory, such as a USB memory, will be considered.

Figure 5:
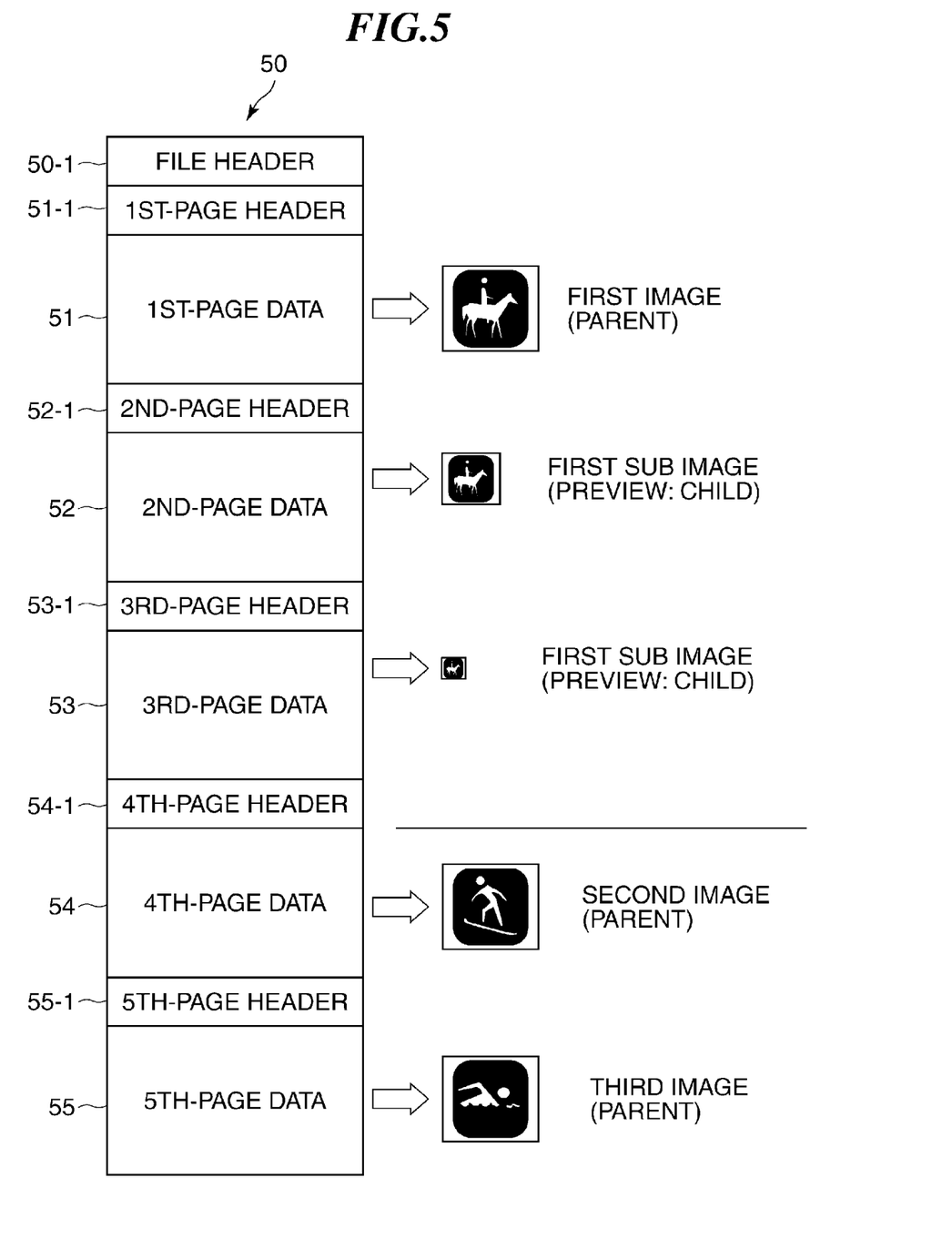
FIG. 5 is a diagram of an example of the structure of a multi-page file received from an external memory by the multifunction peripheral in FIG. 4.

FIG. 5 is a diagram of an example of the structure of a multi-page file received from an external memory by the MFP 40 in FIG. 4.

As shown in FIG. 5, the multi-page file 50 has five-page image data. First-page data 51 contains a first parent image. Second-page data 52 contains a child image associated with the first parent image of the first-page data 51. The child image is a preview image. Third-page data 53 also contains a child image associated with the parent image of the first-page data 51, and the child image is a preview image. However, the child image of the third-page data 53 is a preview image having fewer pixels than the child image of the second-page data 52. Forth-page data 54 and fifth-page data 55 contain parent images different from the parent image of the first-page data 51, and are quite different in contents from the same.

Figure 6:
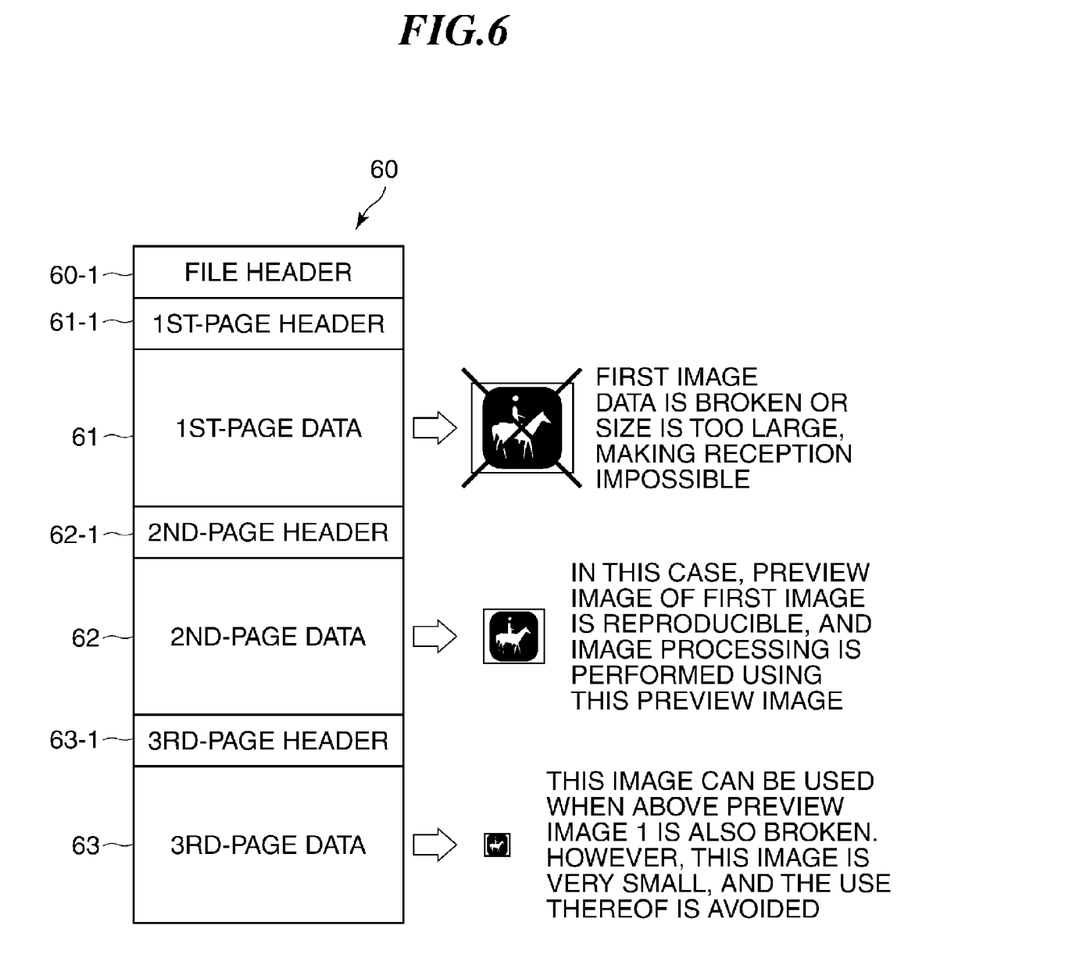
FIG. 6 is a diagram useful in explaining the outline of operation of the multifunction peripheral in FIG. 4, for receiving a multi-page file.

FIG. 6 is a diagram useful in explaining the outline of operation of the MFP 40 in FIG. 4 for receiving a multi-page file.

Referring to FIG. 6, a case is considered where it is determined that a first-page data 61 cannot be normally received e.g. due to breakage of image data or too large an image size of the image data.

In such a case, the other pages of the identical multi-page file 60, i.e. second-page data 62 and third-page data 63 are referred to. More specifically, it is checked, based on page headers 62-1 and 63-1, whether or not the second-page data 62 and the third-page data 63 contain child images associated with the parent image of the first image data (first-page data) 61, and contain respective data items indicative of attribute information associated with the parent image, e.g. the same attribute information as that of the first page.

For example, it can be understood from the second-page header 62-1 appearing in FIG. 6 that image data contained in the second-page data 62 has attribute information indicating that it is a child image associated with the parent image of the first image data and is a preview image of the same. Therefore, it is determined that the image data contained in the second-page data 62 can be processed as substitute image data for the first image data. Image data contained in the third-page data 63 also has attribute information indicating that it is a preview image of the first image data as the parent image. However, the image data contained in the third-page data 63 is much smaller in image size than the parent image, and hence it is determined that the image data contained in the third-page data 63 is not suitable as substitute image data for the first image data, and hence the image data of the third page data 63 is not used as substitute image data for the first image data.

As described above, even when the first image data cannot be received, the image data contained in the second-page data 62 closest to the first image data and having a rather high image quality is extracted as substitute image data and processed.

Hereafter, an image processing method according to the present embodiment will be described in detail.

Figure 7A:
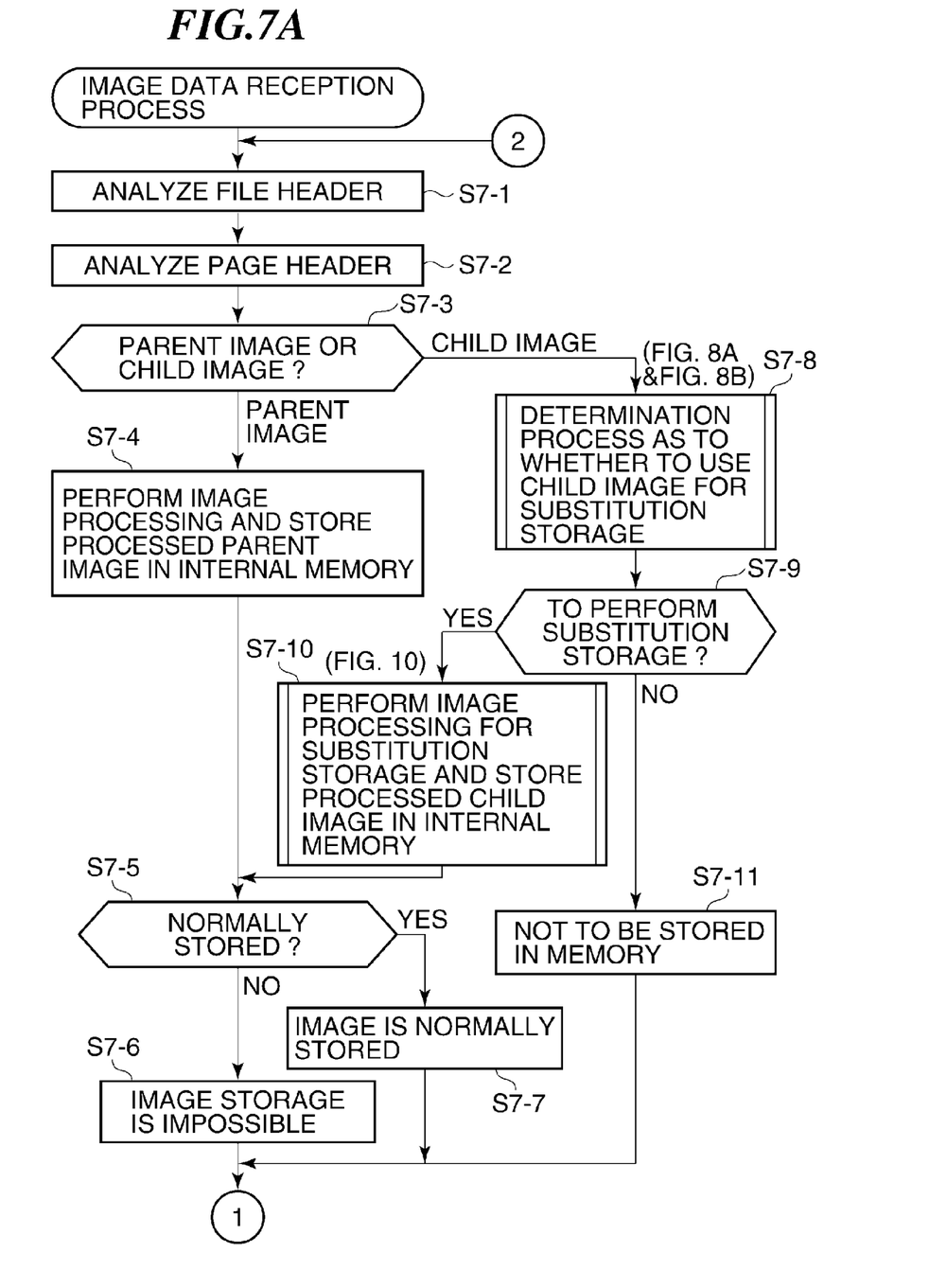
FIGS. 7A and 7B are a flowchart of an image data reception process executed by a CPU of the multifunction peripheral in FIG. 4.
Figure 7B:
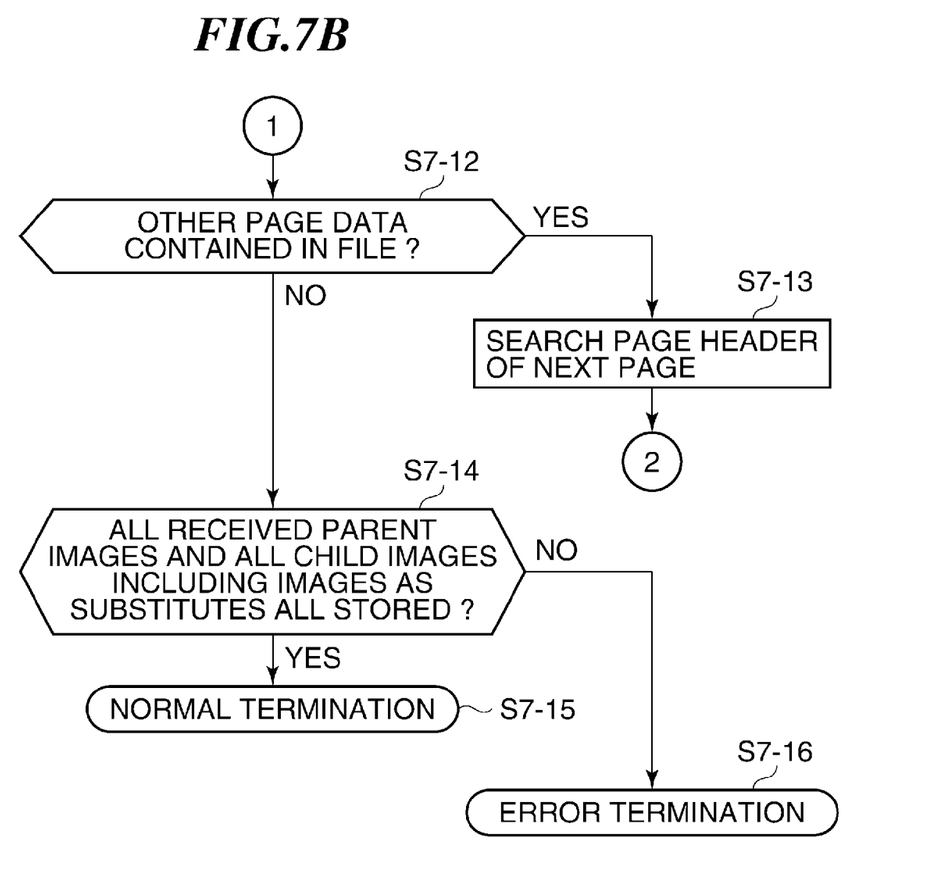

FIGS. 7A and 7B are a flowchart of an image data reception process executed by the CPU 4-1 of the MFP 40 in FIG. 4.

Referring to FIGS. 7A and 7B, in a case where the MFP 40 receives and stores a multi-page file in an internal memory (the SRAM 4-3 or the DRAM 4-4), first, the CPU 4-1 performs file header analysis (step S7-1). In the file header analysis, the first-page header data position of the multi-page file is searched for, and then first-page header analysis is performed (step S7-2).

After execution of the page header analysis, it is determined whether this page contains a parent image or a child image (step S7-3). If it is determined in the step S7-3 that the page contains a parent image, reception processing is to be executed, and therefore image processing and/or code processing is performed on the page data as required, followed by the processed page data being stored in the internal memory (step S7-4). Then, it is determined whether or not the page data has been normally stored (step S7-5). If the page data has been normally stored, information on the normal storage of the parent image contained in the page is stored (step S7-7), followed by the process proceeding to a step S7-12. On the other hand, if the page could not be normally stored due to breakage of the image data, its data format that cannot be processed by the MFP 40, or the like, information on failure of normal storage of the parent image contained in the page is stored (step S7-6), followed by the process proceeding to the step S7-12. In this stage, the sequential reception process for receiving the multi-page file is not terminated in error.

If it is determined in the step S7-3 that the page contains a child image, a process described hereinafter with reference to FIGS. 8A and 8B, i.e. a determination process for determining whether or not to store the child image as a substitute image is executed (step S7-8), and it is determined, based on the determination process, whether or not to store the child image as a substitute image (step S7-9). If it is determined that the child image is to be stored as a substitute image, the image data of the child image is subjected to a process described hereinafter with reference to FIG. 10, i.e. the image processing and/or code processing, and then the processed image data is stored in the internal memory (step S7-10). Then, the process proceeds to the step S7-5 for determining whether the processed image data is normally stored. Storage processing in the FIG. 10 process is different from the processing for storing the parent image in that it additionally includes special processing. The storage processing will be described in detail hereinafter. On the other hand, if it is determined in the step S7-9 that the child image is not to be stored as a substitute image, the process proceeds, without storing the child image data in the internal memory (step S7-11), to the step S7-12.

When the page processing is thus completed, it is determined whether or not the same file contains other page data (image data) (step S7-12). If the file contains other page data, a next page header is searched for (step S7-13), and the page header is subjected to header analysis (step S7-2). The steps S7-2 to S7-13 are repeatedly carried out until image data portions within the file are all processed. Then, it is determined whether or not all parent images that can be normally received and all child images including child images subjected to substitution processing for all parent images that cannot be normally received have been stored in the internal memory (step S7-14). If all the above-mentioned images have been stored, the process is normally terminated (step S7-15), whereas if not, the process is terminated in error (step S7-16).

On the other hand, if it is determined in the step S7-12 that the file does not contain other image data (page data), the process immediately proceeds to the step S7-14. Then, in the same manner as described above, it is determined whether or not all parent images that can be normally received and all child images including child images subjected to substitution processing for all parent images that cannot be normally received have been stored in the internal memory (step S7-14). If all the above-mentioned images have been stored, the process is normally terminated (step S7-15), whereas if not, the process is terminated in error (step S7-16).

According to the process in FIGS. 7A and 7B, even when not all parent images can be received e.g. for a reason that one or more parent images have too large a capacity or that data has been destroyed, it is possible to receive child images as substitute images. Therefore, the frequency of error occurrence in reception of multi-page data can be considerably reduced.

In FIGS. 7A and 7B, even when a parent image cannot be normally received for some reason, and at the same time no child image associated with the parent image exists in the same file (including a case where another parent image exists), the fact is ignored and the image processing is not stopped. However, when a parent image is not normally received and stored and at the same time no associated child image exists, or when neither a parent image nor child images associated with the parent image can be normally received and stored, all the processing may be immediately terminated at the time point.

Figure 8A:
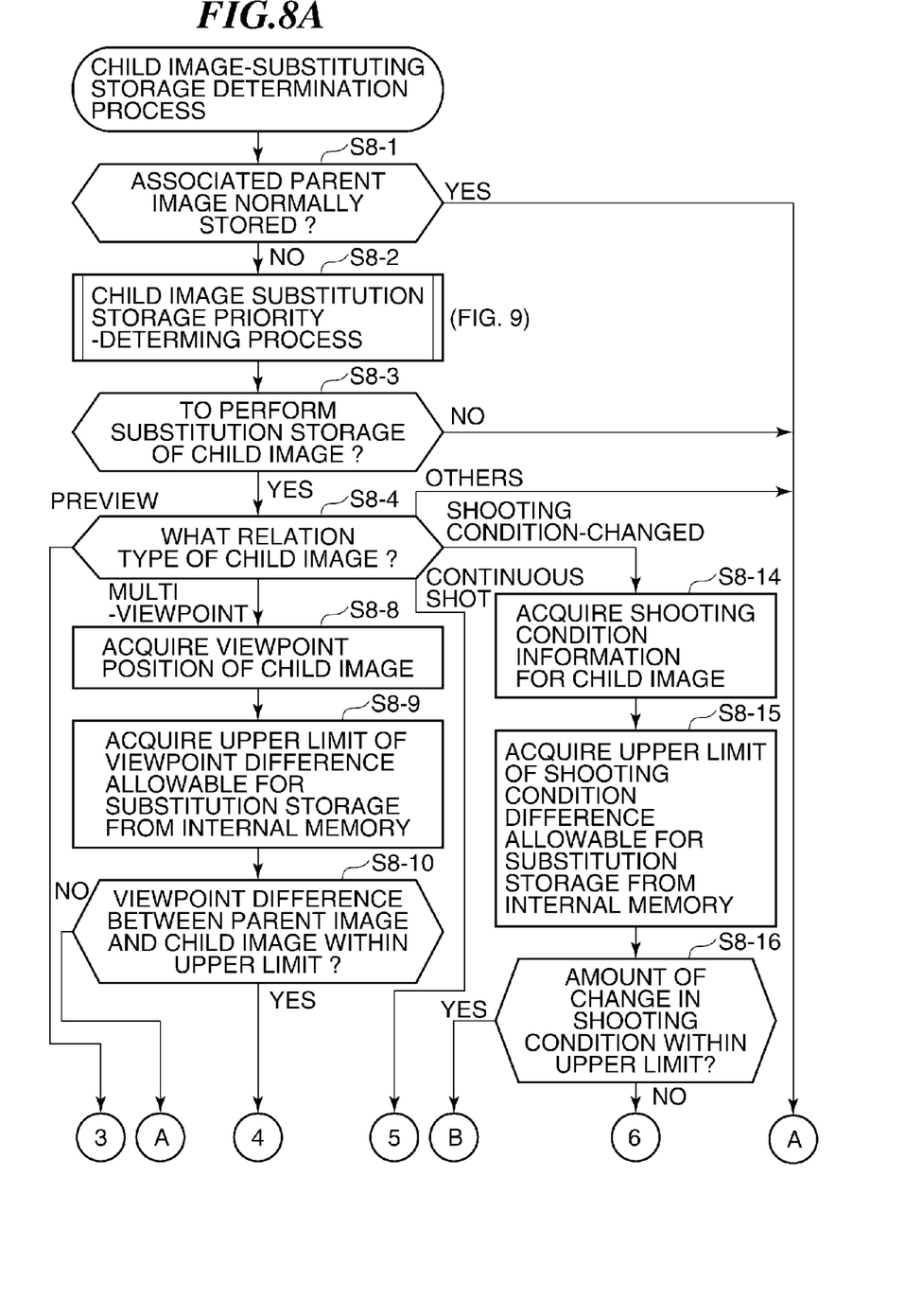
FIGS. 8A and 8B are a flowchart of a child image-substituting storage determination process executed in a step in FIG. 7A.
Figure 8B:
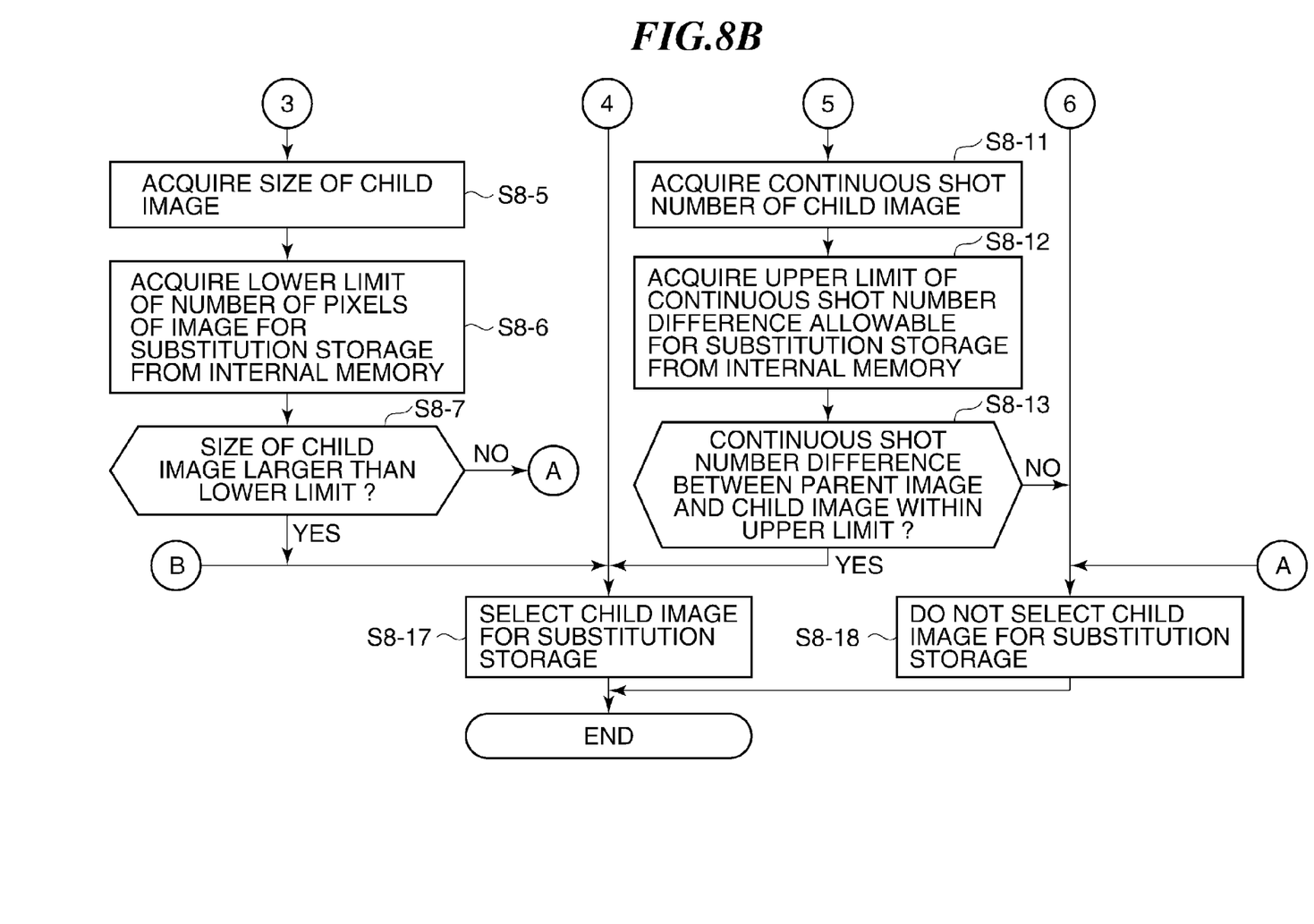

FIGS. 8A and 8B are a flowchart of a child image-substituting storage determination process executed in the step S7-8 in FIG. 7A.

Referring to FIGS. 8A and 8B, when a page to be processed contains a child image, determination as to whether or not to store the child image page is performed as follows: First, the CPU 4-1 determines whether or not image data corresponding to a parent image for the child image has been normally received (step S8-1). If it is determined that the parent image data has been normally received, it is not required to store a child image as a substitute image, and hence it is determined that the child image is not to be selected for substitution storage (step S8-18), followed by terminating the present process.

Figure 9:
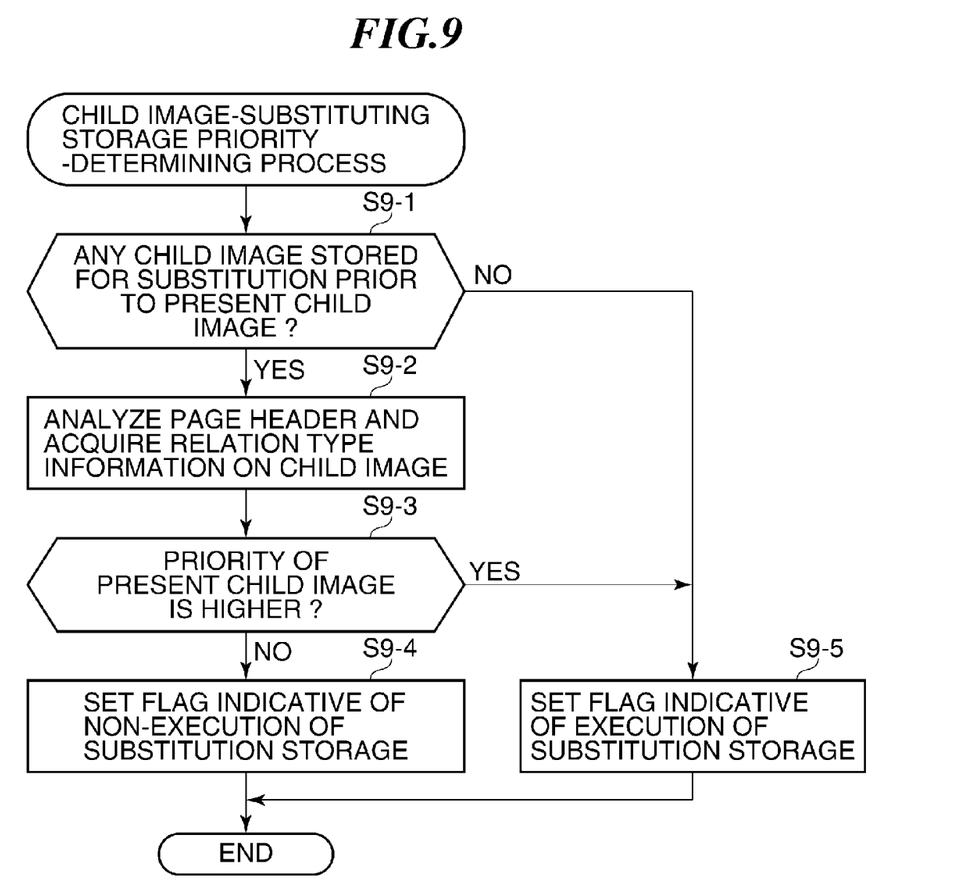
FIG. 9 is a flowchart of a child image-substituting storage priority-determining process executed in a step in FIG. 8A.

On the other hand, if it is determined in the step S8-1 that the parent image data associated with the child image has not been normally received, a child image-substituting storage priority-determining process described hereinafter with reference to FIG. 9 is executed. More specifically, it is determined whether or not there is a child image associated with the same parent image and already stored for substitution, and if there is, determination as to priority between the child images is performed (step S8-2).

After execution of the child image-substituting storage priority-determining process (step S8-2), it is determined whether or not the child image is to be stored for substitution (step S8-3). More specifically, when there is another child image more suitable for substitution storage, it is determined that the child image is not suitable for substitution storage and hence it is not to be selected for substitution (step S8-18), followed by terminating the present process. On the other hand, if it is determined in the step S8-3 that the child image is to be stored for substitution (YES to the step S8-3), relation type information indicative of the relation between the parent image and the child image is checked (step S8-4).

Thereafter, it is determined again, based on the relation type information, whether or not the child image is suitable for substitution storage. More specifically, if the child image is a preview image of the parent image, a pixel size of the child image contained in the page is acquired (step S8-5). Then, a lower limit size of an image to be stored for substitution, which is preset e.g. by the user, is acquired from the internal memory (step S8-6), and it is determined whether or not the number of pixels forming the child image is larger than that corresponding to the lower limit size (step S8-7). Then, if the image size is smaller than the lower limit size, it is determined that the child image is not suitable for substitution storage and hence it is not to be selected for substitution storage (step S8-18), followed by terminating the present process. On the other hand, if it is determined in the step S8-7 that the number of the pixels forming the child image is larger than that corresponding to the lower limit size, it is determined that the child image is suitable for substitution storage and hence it is to be selected for substitution storage (step S8-17), followed by terminating the present process. Thus, it is possible to prevent an image having too small a number of pixels from being selected for substitution storage.

Further, if the child image is one of multi-viewpoint images, first, viewpoint position information on the child image is acquired (step S8-8). Then, an upper limit value of a maximum viewpoint difference between an image to be received for substitution and an associated parent image, which is preset in the MFP 40 by the user, is acquired (step S8-9). Then, it is determined whether a viewpoint difference between the child image and the associated parent image is not larger than the upper limit value (step S8-10), and if the viewpoint difference is larger than the upper limit value, it is determined that the child image is not to be selected for substitution storage (step S8-18), followed by terminating the present process. On the other hand, if the viewpoint difference is not larger than the upper limit value, it is determined that the child image is suitable for substitution storage and hence it is to be selected for substitution storage (step S8-17), followed by terminating the present process. Thus, it is possible to prevent a child image which looks quite different from a parent image due to too large a viewpoint difference from being stored for substitution.

Furthermore, if the child image is one of continuous shot images associated with the parent image, first, the continuous shooting number of the child image is acquired (step S8-11). Then, an upper limit value of number difference between an image to be received for substitution and an associated parent image, which is preset in the main unit of the MFP 40 by the user, is acquired (step S8-12). Then, it is determined whether the continuous shooting number of the child image is not larger than the upper limit value of the number difference (step S8-13), and if the continuous shooting number is larger than the upper limit value, it is determined that the child image is not suitable for substitution storage and hence it is not to be selected for substitution storage (step S8-18), followed by terminating the present process. On the other hand, if the continuous shooting number is not larger than the upper limit value, it is determined that the child image is suitable for substitution storage and hence it is to be selected for substitution storage (step S8-17), followed by terminating the present process. Thus, it is possible to prevent a child image which looks quite different from a parent image due to too large a difference in the continuous shooting number from being stored for substitution.

What is more, if the child image is a shooting condition-changed image associated with the parent image, first, shooting condition information on the child image is acquired (step S8-14). Then, an upper limit value of shooting condition difference between an image to be stored for substitution and an associated parent image, which is preset in the main unit of the MFP 40 by the user, is acquired (step S8-15). Then, it is determined whether a difference between a shooting condition under which the child image was shot and a shooting condition under which the parent image was shot is not larger than the upper limit value (step S8-16), and if the difference in the shooting condition is larger than the upper limit value, it is determined that the child image is not suitable for substitution storage and hence it is not to be selected for substitution storage (step S8-18), followed by terminating the present process. On the other hand, if the difference in the shooting condition is not larger than the upper limit value, it is determined that the child image is suitable for substitution storage and hence it is to be selected for substitution storage (step S8-17), followed by terminating the present process. Thus, it is possible to prevent a child image which is too bright or dark and hence looks quite different from a parent image, due to too large a difference in the shooting condition from the parent image, from being stored for substitution.

According to the process in FIGS. 8A and 8B, determination as to whether or not a child image is suitable for substitution storage is performed based on the relation type of the child image, e.g. whether the child image is a preview image, a multi-viewpoint image, a continuous shot image, or a shooting condition-changed image. This makes it possible not to select child images largely different from an associated parent image but select a child image having the same attribute information as the parent image and closely analogous to the same, as an image for substitution storage.

In the present embodiment, since the associated parent image has not been normally stored (NO to the step S8-1), the child image-substituting storage priority-determining process is executed (step S8-2) before storing a child image as a substitute image. Thus, by determining whether there is another child image in better condition than the child image, or by determining, based on each item of the relation type information, whether the child image has not been too largely changed from the parent image, it is possible to maintain high image quality for substitution storage.

FIG. 9 is a flowchart of the child image substitution storage priority-determination process executed in the step S8-2 in FIG. 8A.

Referring to FIG. 9, the child image substitution storage priority-determination process is executed as follows: First, the CPU 4-1 determines, before storing the child image, whether or not another child image has been stored as a substitute image (step S9-1). When no child image has been stored as a substitute image, there is no comparison. Therefore, it is determined that the child image is to be stored as a substitute image, and a flag indicative of execution of substitution storage is set (step S9-5), followed by terminating the present process.

On the other hand, before storing the child image, if it is determined in the step S9-1 that another child image has already been stored as a substitute image, it is determined which of the child image having already stored as a substitute image and the child image in question is more suitable for substitution storage. More specifically, if another child image has already been stored as a substitute image prior to the child image in question (YES to the step S9-1), a page header associated with the latter is analyzed, and relation type information on the child image is acquired (step S9-2).

Next, based on the acquired relation type information on the child image, a comparison is made between a priority of the relation type information on the child image having already stored as a substitute image and a priority of the relation type information on the child image based on the candidate image data for the current substitution storage, and it is determined whether or not the latter is higher than the former (step S9-3). If the priority of the relation type information on the child image based on the candidate image data for the current substitution storage is higher, it is determined that the child image based on the candidate image data is to be stored, and the flag indicative of execution of substitution storage is set (step S9-5), followed by terminating the present process. On the other hand, if the priority of the relation type information on the child image having already stored is higher, a flag indicative of non-execution of substitution storage is set for the child image based on the candidate image data for the current substitution storage (step S9-4), followed by terminating the present process. It is assumed that the order of the priorities of the respective relation type information items from highest to lowest is "preview image", "shooting condition-changed image", "continuous shot image", "multi-viewpoint image", and "other images". This is because a preview image or a shooting condition-changed image can be made closer to an associated parent image by image processing executed later. This image processing will be described in detail hereinafter with reference to FIG. 10. It should be noted that the order of the priorities of the respective relation type information items is not limited to the above example, but it may be set as desired by the user.

According to the process in FIG. 9, when a parent image cannot be normally received and stored and when there are a plurality of child images as candidate substitute image data, it is possible to store a more suitable image as a substitute image.

Figure 10:
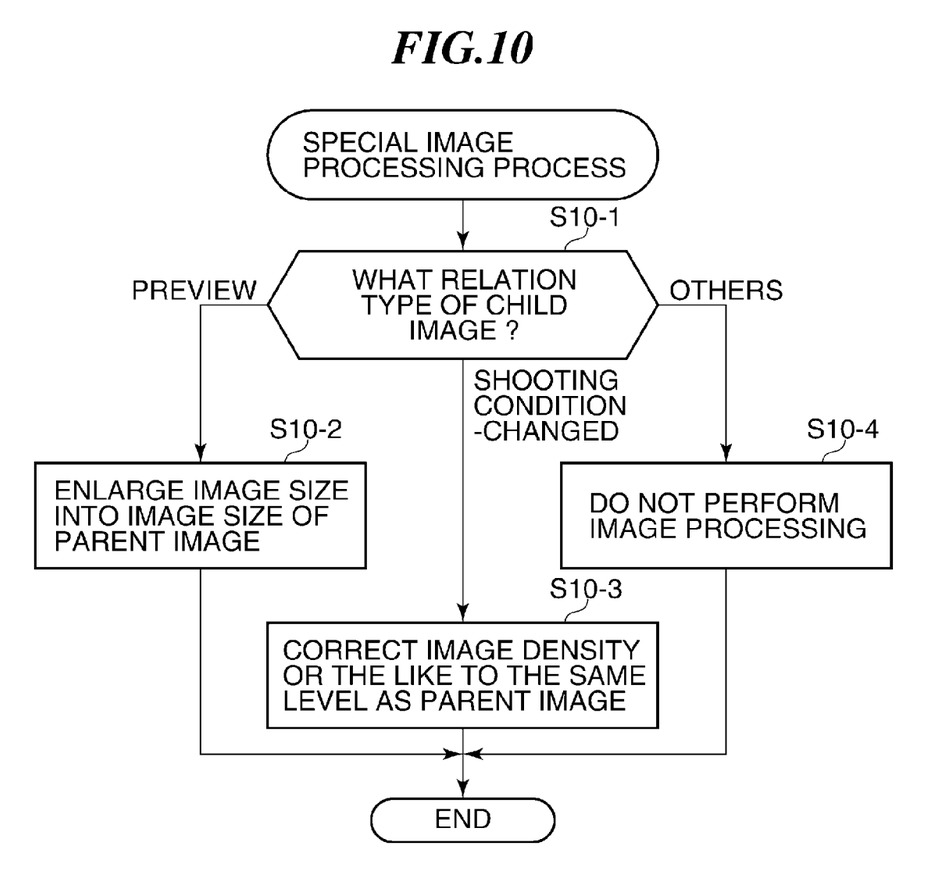
FIG. 10 is a flowchart of a special image processing process executed on an image for substitution storage in a step in FIG. 7A.

FIG. 10 is a flowchart of a special image processing process for processing an image to be stored as a substitute image, which is executed in the step S7-10 in FIG. 7A. The special image processing process for processing an image to be stored as a substitute image is executed before a child image received as a substitute image is stored in the internal memory, in accordance with the characteristics and suitability of the substitute image.

Referring to FIG. 10, the special image processing process for processing an image to be stored as a substitute image is executed as follows: First, the CPU 4-1 checks the relation type of the child image to be stored as a substitute image (step S10-1). If the child image is a preview image and the preview image is to be stored as a substitute image, the child image is enlarged into the same size as that of the parent image to thereby make the substitute image more closely analogous to the parent image (step S10-2), followed by terminating the present process.

Further, if the child image to be processed is an image shot with a changed shooting condition and the child image is to be stored as a substitute image, image density or the like is corrected based on the amount of change of the shooting condition to thereby make the substitute image more closely analogous to the parent image (step S10-3), followed by terminating the present process. For example, when the child image to be processed is a shooting condition-changed image shot under a shooting condition with a different brightness from that in a shooting condition under which the parent image was shot, correction of the brightness of the child image is or like correction processing is performed.

On the other hand, when the child image to be processed has relation type information other than "preview image" and "shooting condition-changed image", i.e. when it is a continuous shot image or a multi-viewpoint image, it is impossible to make the child image more closely analogous to the parent image by correction processing in the image processing process. In this case, therefore, the child image is not subjected to image processing (step S10-4), and the present process is immediately terminated.

According to the process in FIG. 10, it is possible to carry out appropriate similarity-increasing processing for a child image to be stored as a substitute image more, according to its relation type, to thereby make the child image more closely analogous to an associated parent image, so that the child image closely analogous to the parent image can be stored as a substitute image in the internal memory.

The child image is stored as a substitute image for the parent image as described above, and then it is determined whether or not the child image has been normally stored (step S7-5).

According to the present embodiment, even when a plurality of parent image data portions contained in a multi-page file include parent image data that cannot be processed, it is possible to process child image data having attribute information corresponding to that of the parent image data that cannot be processed, as substitute image data. Therefore, in processing of an image data file containing a plurality of image data portions, even if only one image data portion cannot be received, it is possible to continue a series of processes without terminating the processes in error for the reason. In short, it is possible to perform effective processing while reducing the frequency of occurrence of cases where file processing is terminated in error.

In the child image-substituting storage priority-determining process in the present embodiment, a child image having relation type information that allows correction may be preferentially selected for substitution storage, and the flag indicative of execution of substitution storage may be set for the child image.

The child image-substituting storage priority-determining process in FIG. 9 is part of the determination process in FIG. 7A (step S7-8; the flowchart in FIG. 8A) for determining whether or not to store the child image as a substitute image. Therefore, the child image for which the flag indicative of execution of substitution storage is set in the process in FIG. 9 (step S9-5), and which is selected as an image for substitution storage in the process in FIG. 8B (step S8-17), and is accordingly determined to be stored for substitution in the process in FIG. 7A (step S7-9), is then subjected to image processing. More specifically, the child image determined to be stored for substitution in the step S7-9 is subjected to the image processing (see the step S7-10 and FIG. 10) according to the type of the substitute image for substitution storage. Therefore, in the child image-substituting storage priority-determining process in FIG. 9, a child image having relation type information that allows correction can be preferentially selected for substitution storage. For example, in a case where one of a preview image and a continuous shot image is to be stored as a substitute image, the preview image whose image size can be corrected is selected for substitution storage in preference to the continuous shot image.

Further, in the child image-substituting storage priority-determining process, in a case where priority is given to one of child images of the same relation type, an image having a smaller amount of change from an associated parent image can be preferentially stored for substitution. For example, when a comparison is made between child images as preview images, a child image closer in size to an associated parent image is preferentially stored for substitution.

In the present embodiment, a multi-page file to be processed is not limited to a file in the TIFF file format, but it may be in another format.

Although in the present embodiment, data processing is described by taking a reception process as an example, this is not limitative, but data processing may be transmission, printing, storage, or the like processing.

Further, attribute information added to each image data portion of a multi-page file is not limited to the attribute information described in the present embodiment, but it is possible to add various kinds of information as attribute information.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments). For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions This application claims priority from Japanese Patent Application No. 2008-198561 filed Jul. 31, 2008, which is hereby incorporated by reference herein in its entirety.

What is claimed is:

1. An image processing apparatus for processing an image data file including a plurality of image data, comprising:
   a data processing unit configured to process the image data;
   an extracting unit configured to be operable when the image data file includes image data that cannot be processed, to extract other image data having attribute information associated with the image data that cannot be processed, from the image data file; and
   a control unit configured to cause said data processing unit to process the other image data extracted by said extracting unit, as substitute image data for the image data portion that cannot be processed,
   wherein the attribute information comprises at least one of information indicating that the image data is a parent image or a child image, parent image information indicative of an associated parent image, child image information indicative of an associated child image, relation type information indicative of a type of relation between the parent image and the child image, and relation type subdata information indicative of a type of relation between the parent image and the child image.

2. The image processing apparatus according to claim 1, wherein the image data has a page header, and the attribute information is stored in the page header.

3. The image processing apparatus according to claim 1, wherein the relation type information comprises at least one of preview information, continuous shooting information, shooting condition change information, and multi-viewpoint information.

4. The image processing apparatus according to claim 3, comprising a similarity-increasing unit configured to make the substitute image data more closely analogous to the image data that cannot be processed, according to the relation type information.

5. The image processing apparatus according to claim 3, wherein when there are a plurality of candidate substitute image data items having same relation type information, said extracting unit extracts, as substitute image data, image data having a smallest amount of change from the image data that cannot be processed.

6. The image processing apparatus according to claim 3, wherein when there are a plurality of candidate substitute image data having different relation type information, said extracting unit extracts a preview image as substitute image data in preference to a continuous shot image.

7. The image processing apparatus according to claim 1, wherein when said extracting unit cannot extract other image data having the attribute information associated with the image data that cannot be processed, said control unit controls said data processing unit such that said data processing unit ignores processing on the image data that cannot be processed and sequentially process image data following the image data that cannot be processed.

8. The image processing apparatus according to claim 1, wherein when said extracting unit cannot extract other image data having the attribute information associated with the image data that cannot be processed, said control unit terminates all image processing.

9. The image processing apparatus according to claim 1, wherein processing for the image data executed by said data processing unit is at least one of reception processing, transmission processing, printing processing, and storage processing.

10. A method of processing an image data file including a plurality of image data, comprising:

processing the image data;

extracting, when the image data file includes image data portion that cannot be processed, other image data having attribute information associated with the image data that cannot be processed, from the image data file; and processing the extracted other image data, as substitute image data for the image data that cannot be processed, wherein the attribute information comprises at least one of information indicating that the image data is a parent image or a child image, parent image information indicative of an associated parent image, child image information indicative of an associated child image, relation type information indicative of a type of relation between the parent image and the child image, and relation type subdata information indicative of a type of relation between the parent image and the child image.

11. A non-transitory computer-readable storage medium storing a program for causing a computer to execute a method of processing an image data file including a plurality of image data, wherein the method comprises: processing the image data; extracting, when the image data file includes image data that cannot be processed, other image data having attribute information associated with the image data that cannot be processed, from the image data file; and processing the extracted other image data, as substitute image data for the image data that cannot be processed, wherein the attribute information comprises at least one of information indicating that the image data is a parent image or a child image, parent image information indicative of an associated parent image, child image information indicative of an associated child image, relation type information indicative of a type of relation between the parent image and the child image, and relation type subdata information indicative of a type of relation between the parent image and the child image.

* * * * *